(12) United States Patent
Hong

(10) Patent No.: US 9,004,594 B2
(45) Date of Patent: Apr. 14, 2015

(54) ACTUATOR SYSTEM FOR CONTROLLING LUMBAR SUPPORT

(71) Applicant: Cheong Myung Hong, Seoul (KR)

(72) Inventor: Cheong Myung Hong, Seoul (KR)

( * ) Notice: Subject to any disclaimer, the term of this patent is extended or adjusted under 35 U.S.C. 154(b) by 62 days.

(21) Appl. No.: 13/667,300

(22) Filed: Nov. 2, 2012

(65) Prior Publication Data

US 2014/0125101 A1 May 8, 2014

(51) Int. Cl.
*B60N 2/66* (2006.01)

(52) U.S. Cl.
CPC .......................................... *B60N 2/66* (2013.01)

(58) Field of Classification Search
USPC ............ 297/284.4, 284.7; 74/500.5, 501.5 R, 74/509
See application file for complete search history.

(56) References Cited

U.S. PATENT DOCUMENTS

| | | | | |
|---|---|---|---|---|
| 5,217,278 A * | 6/1993 | Harrison et al. | ......... | 74/501.5 R |
| 5,954,399 A * | 9/1999 | Hong | ......................... | 297/284.4 |
| 6,050,641 A * | 4/2000 | Benson | ....................... | 297/284.4 |
| 6,095,605 A * | 8/2000 | Lai | ................................ | 74/502.4 |
| 7,131,694 B1 * | 11/2006 | Buffa | ......................... | 297/284.4 |
| 7,770,972 B2 * | 8/2010 | Popa | ......................... | 74/501.5 R |
| 8,544,954 B2 * | 10/2013 | Maierhofer et al. | ........ | 297/284.4 |
| 2006/0178603 A1 * | 8/2006 | Popescu | ..................... | 297/284.4 |

* cited by examiner

*Primary Examiner* — Peter Brown
(74) *Attorney, Agent, or Firm* — Kirton McConkie; Evan R. Witt

(57) ABSTRACT

An actuator system for controlling a lumbar support includes a wire fixed and coupled with a lumbar support at one end; a driving motor rotatable in either the clockwise or counter-clockwise direction; a worm coupled with the driving shaft of a driving motor; a deceleration part having a worm gear and a screw which decelerates the power of the driving motor; a slider connected to the other end of the wire, and having a protrusion portion and a spiral groove so as to carry out rectilinear reciprocating motion according to the rotation direction of the driving motor; and a housing inserted by the slider and having a wire-passing hole, a connection hole, a mounting hole and a guide hole, wherein the bending degree of a lumbar support may be automatically controlled by rotation driving force applied in a set range, thereby providing riding comfort to passengers.

4 Claims, 5 Drawing Sheets

ACTUATOR SYSTEM FOR CONTROLLING LUMBAR SUPPORT

TECHNICAL FIELD

The present invention relates to an actuator system for controlling a lumbar support which is mounted in a seat back for supporting the lumbar vertebra of a driver or a passenger, wherein the lumbar support may be automatically controlled by power.

BACKGROUND ART

In general, the seats of a vehicle should be mounted in a limited space of the vehicle and in a limited weight range for supporting passengers safely and pleasantly. Therefore, a seat back includes a seat back frame and a seat back pad for supporting the waist and back of a driver or a passenger, and a driver who sits in the driver's seat or a passenger who sits in a passenger's seat beside the driver's seat pulls forwards or pushes backwards the seat back according to driving habits and body conditions by means of a rotation device of the seat, thereby controlling the angle of the seat back.

In particular, it is difficult to essentially correspond to the change in the seating posture of the driver or the passenger by just the seat back frame and the seat back pad in the case of long time driving. Therefore, a buffering device and a lumbar support are mounted in the seat back for comfortably surrounding the back of the driver or the passenger and comfortably supporting the lumbar vertebra.

Even though it is possible to change the bending degree of such a conventional lumbar support by manual adjustment of a rotary lever which is mounted to a side wall portion of the seat, there are demands to provide the convenience of the driver or the passenger in any other way rather than the manual adjustment.

SUMMARY OF THE INVENTION

Problems to be Solved by the Invention

Therefore, the present invention has been accomplished in order to resolve the above-mentioned disadvantages and any other problems, and an object of the present invention is to provide an actuator system for controlling a lumbar support, wherein the bending degree of a lumbar support may be automatically controlled by rotation driving force applied in a set range, thereby providing riding comfort to passengers.

Means for Solving the Problems

In order to accomplish the above objects, there is provided an actuator system for controlling a lumbar support, which includes: a wire fixed and coupled with a lumbar support at one end; a driving motor rotating in the clockwise or counterclockwise direction according to an external input signal; a worm coupled with the driving shaft of a driving motor so as to rotate; a deceleration part having a worm gear which is engaged with the worm in a perpendicular direction and a screw which rotates in association with the worm gear and decelerating the power of a driving motor; a slider formed with a protrusion portion at an upper portion, connected to the other end of the wire, and having a spiral groove that is formed on an inner peripheral surface so as to be spirally coupled with the outer peripheral surface of the screw such that the slider carries out rectilinear reciprocating motion according to the rotation direction of the driving motor; and a housing inserted by the slider to the inside thereof and having a wire-passing hole that is formed in an outer peripheral surface such that the wire penetratingly passes through the wire-passing hole, a connection hole that is formed at one side end portion such that the worm is inserted and mounted thereto, a mounting hole that is formed inside so as to secure the deceleration part and communicate with the connection hole, and a guide hole that is formed to be concave on the upper end of the inner peripheral surface of the mounting hole in the lengthwise direction of the mounting hole such that the protrusion portion of the slider is inserted thereto.

The actuator system preferably further includes a holding member securing groove which is penetratingly formed in the center of the protrusion portion such that a holding member which is formed at the other end of the wire may be secured thereto.

Further, the actuator system preferably further includes a stopper which protrudes from the guide hole in a protrusion structure for limiting the movement range of the protrusion portion.

Furthermore, the actuator system preferably further includes a motor control part, which has a hall sensor for sensing the revolutions per minute of the driving shaft of the driving motor such that the motor control part stops the operation of the driving motor as the revolutions per minute of the driving shaft of the driving motor reaches preset revolutions per minute, wherein the operation of the driving motor is stopped by the motor control part if it is determined by the hall sensor that the driving shaft of the driving motor rotates by the preset revolutions per minute.

Effects of the Invention

The actuator system for controlling a lumbar support of the present invention may automatically control the bending degree of a lumbar support by rotation driving force applied in a set range, thereby providing riding comfort to a passenger.

BRIEF DESCRIPTION OF DRAWINGS

The above and other aspects, features and other advantages of the subject matter of the present invention will be more clearly understood from the following detailed description taken in conjunction with the accompanying drawings, in which.

BEST MODES FOR CARRYING OUT THE INVENTION

Hereinafter, an actuator system for controlling a lumbar support according to an exemplary embodiment of the present invention will be described in view of the configuration and operations of the present invention with reference to accompanying drawings.

Figure 1:
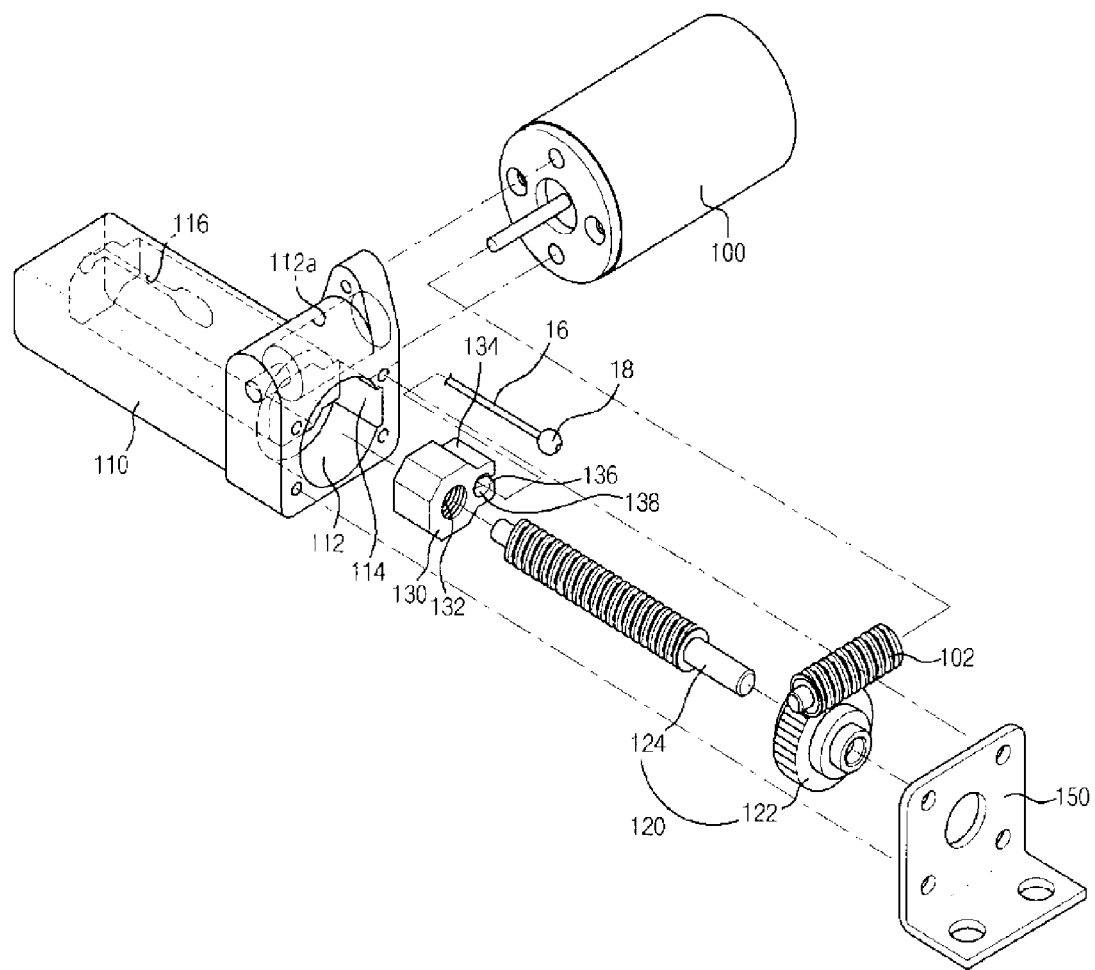
FIG. 1 and FIG. 2 are perspective views respectively showing the assembled state and the disassembled state of an actuator system for controlling a lumbar support according to a preferred embodiment of the present invention.
Figure 2:
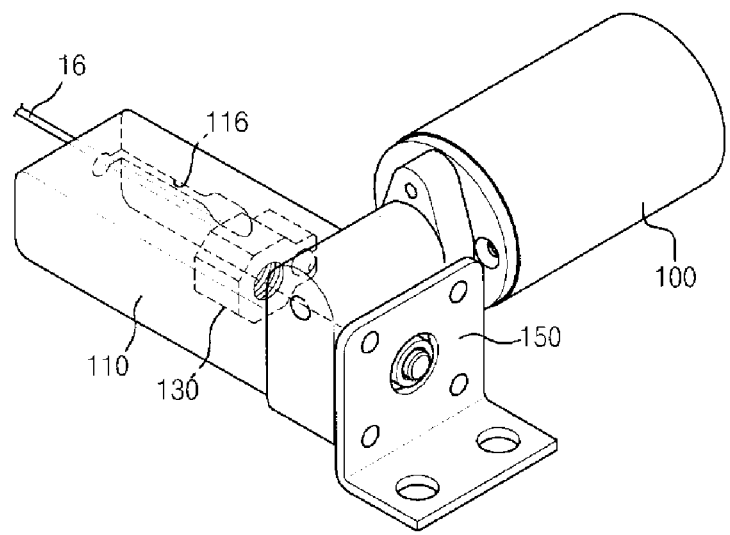
Figure 3:
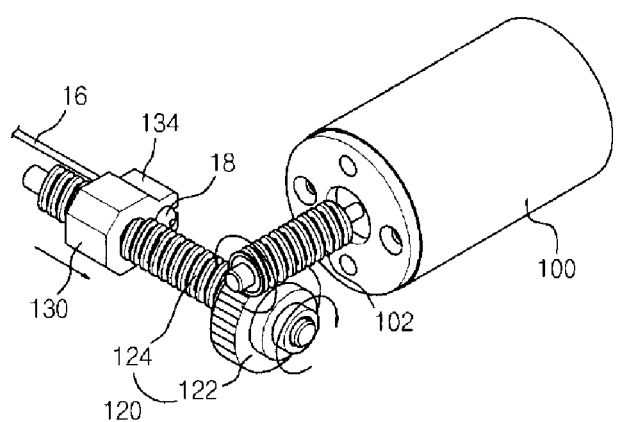
FIG. 3 is a perspective view showing component elements from a driving part to a slider which are driven in the actuator system for controlling a lumbar support according to the preferred embodiment of the present invention.

An actuator system for controlling a lumbar support according to a preferred embodiment of the present invention includes a driving motor 100, a housing 110, a deceleration part 120, a slider 130 and a fixing bracket 150 as shown in FIG. 1 to FIG. 3.

Figure 4:
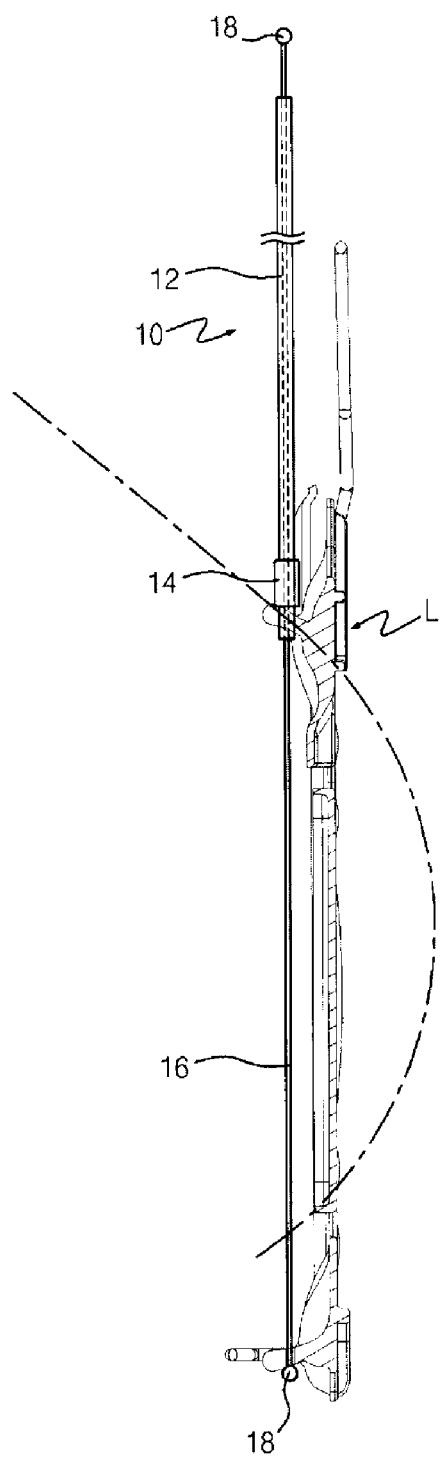
FIG. 4 is a side sectional view showing the state that a supporting height control part is mounted to the lumbar support in the actuator system for controlling a lumbar support according to the preferred embodiment of the present invention.

Referring to FIG. 4, the actuator system of the present invention is connected to a lumbar support L by a supporting height control part 10 having a wire 16, and continuously controls the bending degree of the lumbar support L by power by pulling the wire 16.

At this time, the supporting height control part 10 is connected to a seat back frame (not shown), which supports the rear surface of the lumbar support L, and includes support tube 12 that is positioned between the seat back frame and the actuator system and a wire 16 that penetrates the support tube 12 and is connected to the lower side end of the seat back frame.

Further, the seat back frame (not shown), which supports the rear surface of the lumbar support L, is fixedly formed with a support member 14 which supports one side end of the support tube 12. Therefore, the support tube 12 is fixed by the support member 14 such that the support tube 12 cannot move and only the wire 16 may slide via the support member 14 in the vertical direction.

Furthermore, the wire 16 is provided with holding members 18 at both side ends, wherein the holding member 18 which is formed at the upper side end of the wire 16 is fixed to the actuator system while the holding member 18 which is formed at the lower side end of the wire 16 is fixed to the lower end of the lumbar support L. Therefore, if the wire 16 is pulled by the operation of the actuator system, the lumbar support L is elastically bent by the holding member 18 of the wire 16, which is fixed at the lower side end of the lumbar support L.

The driving motor 100 is a motor to serve for supplying pulling power or releasing the pulling power with respect to the other end of the wire 16, which is connected to one end of the lumbar support L, as shown in FIG. 1 to FIG. 3 and is mounted to one side wall of the housing 110. At this time, the driving shaft of the driving motor 100 is mounted with a worm 102, which is engaged with the worm gear 122 of the deceleration part 120, such that the driving shaft rotates in the forward and backward directions according to the operation of the motor.

The housing 110 has a mounting hole 112 which is formed inside to be open at one end such that the deceleration part 120 may be secured therein, and a guide hole 114 which is formed to be concave on the inner peripheral surface upper end of the mounting hole 112 in the lengthwise direction of the mounting hole 112.

Further, the housing 110 has a connection hole 112*a* which is formed at one side end in the perpendicular direction to the mounting hole 112, wherein the connection hole 112*a* is inserted by the worm 102. At this time, the mounting hole 112 and the connection hole 112*a* are formed to communicate with each other such that the worm 102 and the deceleration part 120 are perpendicularly engaged with each other.

The open one end of the mounting hole 112 is closed by the fixing bracket 150 for the fixing in the seat back.

In addition, the housing 110 has a wire-passing hole 116 at the upper end of the outer peripheral surface, which is formed with the guide hole 114, wherein the wire-passing hole 116 is formed in a structure to communicate with the mounting hole 112 and the rear end of a wire 16 penetratingly passes through the wire-passing hole 116. At this time, the wire-passing hole 116 is preferably formed to be penetrated in the same direction as the lengthwise direction of the guide hole 114.

Herein, in order to readily insert the holding member 18 to the inside of the housing, it is preferable to form the wire-passing hole 116 with a width that is wider at a rear end rather than at a front end as the holding member 18 which is larger than the diameter of the wire 16 is provided at the end of the wire 16.

Further, the deceleration part 120 which is secured to the mounting hole 112 in the housing 110 includes the worm gear 122 which is perpendicularly engaged with the worm 102 and the screw 124 which rotates in association with the worm gear 122.

Herein, the worm gear 122 is engaged with the worm 102 which is provided to the driving shaft of the driving motor 100 in the perpendicularly direction so as to perpendicularly change the rotation direction of the motor and simultaneously decelerate the rotations per minute of the motor to a predetermined gear ratio.

The screw 124 is an output end which is engaged with the end of the worm gear 122 and interlocked with the worm gear 122, wherein a thread is formed on the outer peripheral surface thereof so as to be coupled with the slider 130. This screw 124 is supported by the housing 110 at the front end and by the fixing bracket 150 at the rear end.

Further, the slider 130 is screw-coupled with the screw 124 of the deceleration part 120 so as to carry out rectilinear reciprocation motion according to the operation direction of the driving motor 100. At this time, the slider 130 has a spiral groove 132 which is formed on the inner peripheral surface thereof such that the spiral groove 132 may be screw-coupled with the outer peripheral surface of the screw 124, and a protrusion portion 134 which is formed on the upper portion so as to be inserted to the inside of the guide hole 114.

Therefore, if the deceleration part 120 rotates by the driving motor 100, the protrusion portion 134 is inserted to the guide hole 114 such that the slider 130 does not rotate together with the screw 124 of the deceleration part 120 but carries out rectilinear reciprocation motion along the screw 124 in the mounting hole 112 of the housing 110. While the slider 130 carries out the rectilinear reciprocation motion in the mounting hole 112 of the housing 110 as described above, the protrusion portion 134 also carries out the rectilinear reciprocation motion in the guide hole 114.

Furthermore, the protrusion portion 134 has a holding member securing groove 138 which is formed in the center portion such that the holding member 18 that is formed at the end of the wire 16 is secured thereto. Herein, in order to prevent the deviation of the holding member 18, it is preferable that the front end of the holding member securing groove 138 through which the wire 16 passes is formed in a smaller diameter than the holding member 18. In addition, it is preferable that a groove 136 is formed on the outer peripheral surface of the protrusion portion 134 such that the wire 16 is inserted to the holding member securing groove 138.

The wire 16 which is fixed to the end of the holding member securing groove 138 as described above may be connected to the lumbar support L out of the housing via the wire-passing hole 116.

And, the fixing bracket 150 is formed in a bent shape so as to fix the actuator system in the seat back, wherein the fixing bracket 150 supports the shaft of the screw 124 at the worm gear 122 side while sealing the mounting hole 112 if the fixing bracket 150 is coupled at the mounting hole 112 side of the housing 110.

Meanwhile, it is preferable that the actuator system of the present invention further includes a stopper (not shown) which may mechanically or electronically control the movement range of the slider 130.

Figure 5:
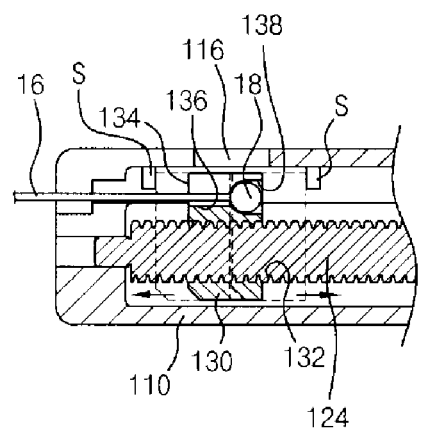
FIG. 5 is a sectional view showing a stopper which limits the position of the slider in the actuator system for controlling a lumbar support according to the preferred embodiment of the present invention.

Referring to FIG. 5, a stopper S which mechanically operates is formed in a protrusion structure, in which the stopper S protrudes towards the center portion from the inner peripheral surface of the housing 110 that is formed with the guide hole 114. Therefore, the stopper S in the protrusion structure is protrudingly formed on the guide hole 114 and carries out the functions of a stopper such that the movement of the protrusion portion 134 is restrained and accordingly the movement range of the slider 130 is restrained.

In addition, a stopper which electronically operates includes a hall sensor which senses the rotations per minute of the driving shaft of the driving motor 100, and a motor control part which stops the motor operations of the driving motor 100 as the driving shaft of the driving motor 100 reaches preset rotations per minute (not shown in the drawings).

Therefore, the functions of a stopper is carried out by determining in advance whether the driving shaft of the driving motor 100 rotates by the preset rotations per minute via the hall sensor and stopping the motor operations of the driving motor 100 by the motor control part.

Figure 6:
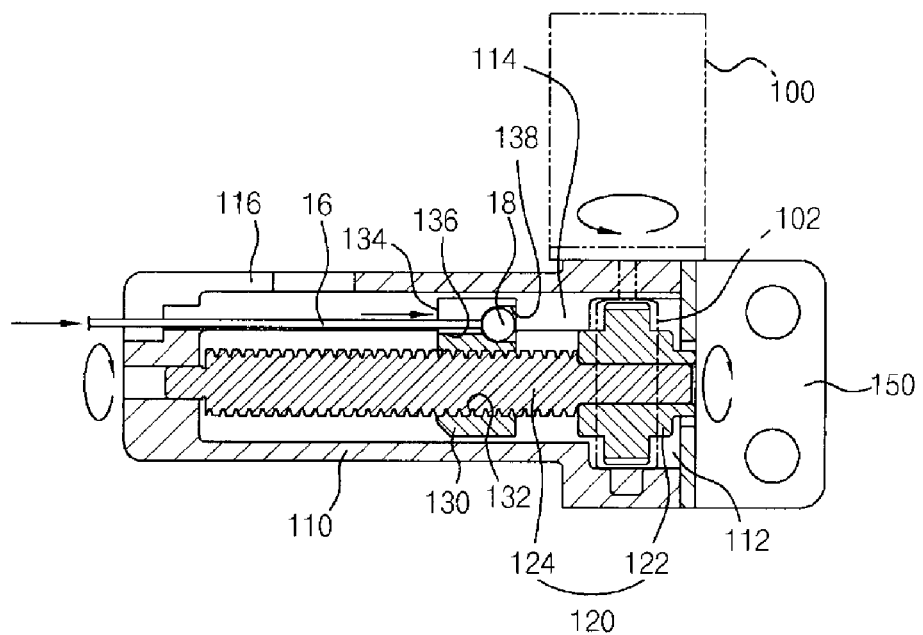
FIG. 6 and FIG. 7 are respectively side sectional views showing the operation states of the actuator system for controlling a lumbar support according to the preferred embodiment of the present invention.
Figure 7:
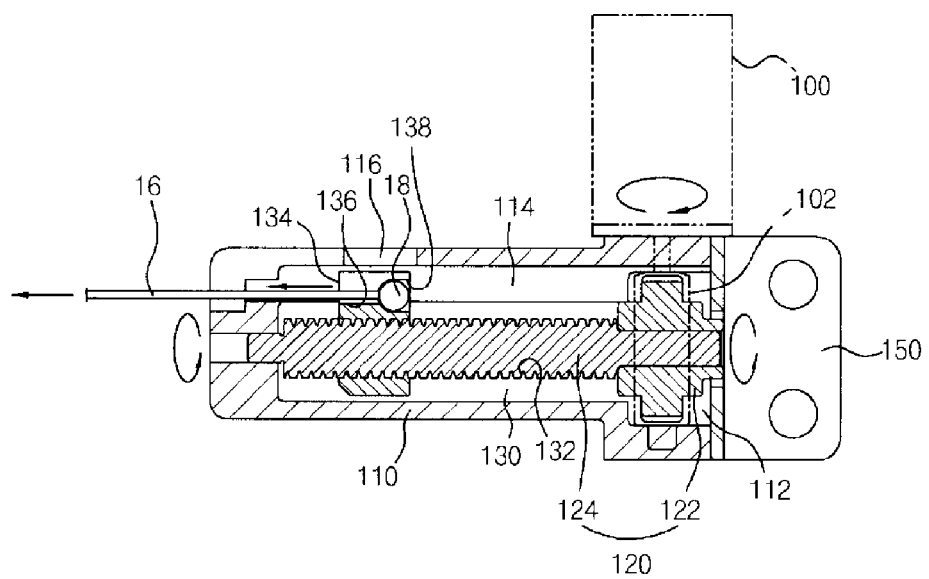

Hereinafter, the operations of the actuator system for controlling a lumbar support according to the present invention will be described in more detail with reference to FIG. 4, FIG. 6 and FIG. 7.

First, as a driver in a driver's seat or a passenger in a passenger seat beside the driver's seat adjusts an adjustment portion (not shown) for the control of the lumbar support L, an adjustment signal is transmitted to a controller (not shown) and the driving motor 100 is applied with power via the controller.

Next, the worm 102 which is mounted to the driving shaft of the driving motor 100 is driven after decelerating the de worm gear 122 at a deceleration ratio and rotates the screw 124 which is coupled with the worm gear 122 such that the slider 130 may move in the opposite direction of the mounting direction of the lumbar support L.

Herein, the slider 130 which is screw-coupled with the screw 124 moves along the screw 124 and pulls the other end of the wire 16 which is supported to the holding member 45 securing groove 138 such that the lower end of the lumbar support L which is connected to the front end of the wire 16 is bent in the direction of the upper end that is fixed in position.

At this time, the slider 130 rotates by a set distance in the mechanic or electronic stopper manner.

If the driving motor 100 oppositely rotates by adjusting the adjustment portion, the worm gear 120 rotates in the opposite direction such that the slider 130 moves in the mounting direction of the lumbar support L. As a result, the lower end of the lumbar support L which is connected to the front end of the wire returns to the original position.

Although the present invention has been described in detail by reference to the forgoing embodiments and accompanying drawings, the present invention is not limited thereto and it is apparent to those skilled in the art that various changes and modifications of the present invention maybe made without departing the spirit and scope of the invention.

DESCRIPTION OF REFERENCE NUMERALS 100 driving motor
102 worm
110 housing
112 mounting hole
114 guide hole
116 wire-passing hole
120 deceleration part
122 worm gear
124 screw
130 slider
132 spiral groove
134 protrusion portion
136 groove
138 holding member securing groove
150 fixing bracket
S stopper

What is claimed is:

1. An actuator system for controlling a lumbar support, comprising:
   a wire fixed and coupled with a lumbar support at one end;
   a driving motor rotating in the clockwise or counterclockwise direction according to an external input signal;
   a worm coupled with the driving shaft of a driving motor so as to rotate;
   a deceleration part having a worm gear which is engaged with the worm in a perpendicular direction and a screw which rotates in association with the worm gear and decelerating the power of a driving motor;
   a slider formed with a protrusion portion at an upper portion, connected to the other end of the wire, and having a spiral groove that is formed on an inner peripheral surface so as to be spirally coupled with the outer peripheral surface of the screw such that the slider carries out rectilinear reciprocating motion according to the rotation direction of the driving motor;
   a housing configured to receive the slider within and having a wire-passing hole that is formed in an outer peripheral surface such that the wire penetratingly passes through the wire-passing hole, a connection hole that is formed at one side end portion such that the worm is inserted and mounted thereto, a mounting hole that is formed inside so as to secure the deceleration part and communicate with the connection hole, and a guide hole that is formed to be concave on the upper end of the inner peripheral surface of the mounting hole in the lengthwise direction of the mounting hole such that the protrusion portion of the slider is inserted thereto: and
   a motor control part, which has a hall sensor for sensing the revolutions per minute of the driving shaft of the driving motor such that the motor control part stops the operation of the driving motor as the revolutions per minute of the driving shaft of the driving motor reaches preset revolutions per minute, wherein the operation of the driving motor is stopped by the motor control part if it is determined by the hall sensor that the driving shaft of the driving motor rotates by the preset revolutions per minute.

2. The actuator system for controlling a lumbar support according to claim 1, further comprising a holding member securing groove which is penetratingly formed in the center of the protrusion portion such that a holding member which is formed at the other end of the wire may be secured thereto.

3. The actuator system for controlling a lumbar support according to claim 1, further comprising a stopper which protrudes from the guide hole in a protrusion structure for limiting the movement range of the protrusion portion.

4. The actuator system for controlling a lumbar support according to claim 3, further comprising a motor control part, which has a hall sensor for sensing the revolutions per minute of the driving shaft of the driving motor such that the motor control part stops the operation of the driving motor as the revolutions per minute of the driving shaft of the driving motor reaches preset revolutions per minute, wherein the operation of the driving motor is stopped by the motor control part if it is determined by the hall sensor that the driving shaft of the driving motor rotates by the preset revolutions per minute.

\* \* \* \* \*